UNITED STATES PATENT OFFICE.

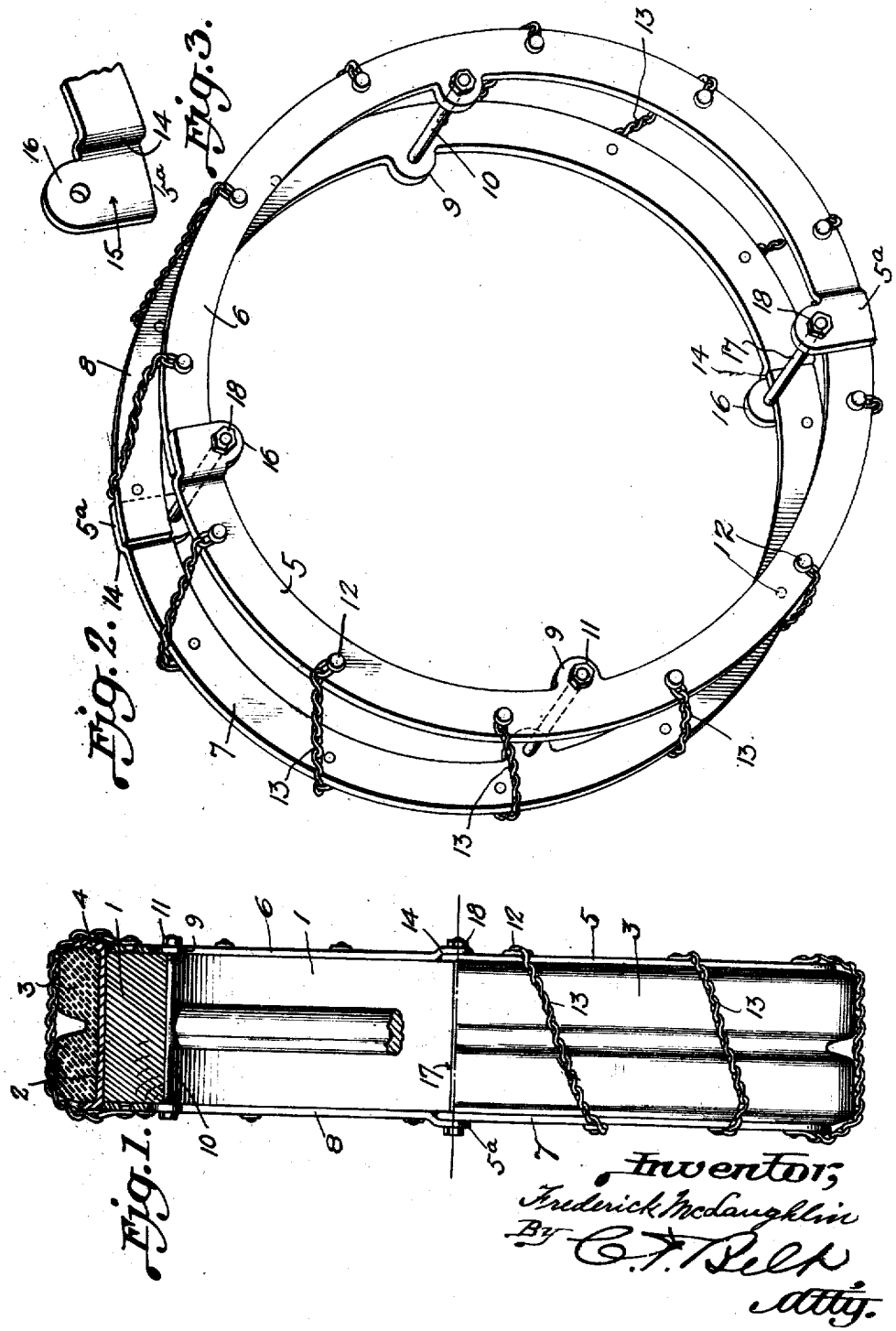

FREDERICK McLAUGHLIN, OF CANTON, ILLINOIS.

ANTISKIDDING ARMOR FOR TRUCK-TIRES.

1,336,363.  Specification of Letters Patent.  Patented Apr. 6, 1920.

Application filed July 3, 1919. Serial No. 308,455.

*To all whom it may concern:*

Be it known that I, FREDERICK McLAUGHLIN, a citizen of the United States, residing at Canton, in the county of Fulton and State of Illinois, have invented certain new and useful Improvements in Antiskidding Armor for Truck-Tires, of which the following is a specification.

This invention relates to armored tire devices, and pertains especially to a non-skidding appliance for motor vehicle tires.

The object of the invention is to provide a non-skidding device applicable to motor vehicle tires, especially solid truck tires, and to embody in such device simplicity of construction for connecting the parts thereof, and affording expeditious means for applying the device.

A further object of the invention is to provide a pair of chain-holding rings in two connected parts or halves of such novel and peculiar construction and relative arrangement as to permit one-half of the rings to be applied to a tire separate or independent of the other half, and to furnish special construction in the meeting ends of said halves affording a joint between said ends without attaching them, whereby said ends are made to have an overlapping engagement.

Other objects, advantages and improved results are attainable in the manufacture and application of the invention as will hereinafter appear.

In the accompanying drawings forming part of this application:—

Figure 1 is a sectional view of part of a truck wheel showing the application of the invention.

Fig. 2 is a perspective view of the chain rings as connected for a tire.

Fig. 3 is a detail perspective view of one of the off set ends.

The same reference characters denote the same parts throughout the several views of the drawings.

In carrying out my invention I employ two plate rings, each ring being divided into a pair of sections and fitting an automobile truck wheel 1, having the usual channeled rim 2 for holding a solid rubber tire 3, said rim having flanges 4.

One pair of ring sections or halves as 5 and 6 correspond with the other pair of sections 7 and 8, each section having an ear 9 formed on the inner periphery for bolts 10, which extend between the wheel spokes and are provided with suitable nuts 11, for clamping the ring sections to the wheel rim 4. Each ring section has secured upon its outer face, as by rivets 12, tread chains 13 which extend diagonally over the tire, by reason of the rivets being placed not opposite but on an angle with respect to each other. This is an important feature in practical utility. These chains are permanently fixed to the ring sections so as to be in position when the rings are applied to a wheel, instead of having to be attached to the rings after the latter are in position.

An essential feature of my invention is in the manner of connecting one pair of ring sections with the other pair so as to permit expansion and contraction of the rings without separating or disconnecting the sections thereof. This I accomplish by offsetting one end of each section so as to form a shoulder 14 and a space 15 in line with the offset section for the other or flat end of the other sections, and forming an ear 16 projecting inwardly from each of the ends 5ª for a bolt 17 which extends through the ears 16 and is provided with a suitable nut 18. The bolts 17 like the bolts 10 extend between the wheel spokes, so that the whole armor is clamped to the wheel rim, but the clamping bolts 18 may be adjusted to permit circular relative movement of the ring sections by reason of the overlapping slip ends without separating the sections. It will be observed that the flat ends of the ring sections are supported by the bolts 18 so as to prevent any possibility of sagging of the slip joints.

Obviously the slip joints permit the ring sections to adjust themselves so as to make the chains fit tightly over a tire without separating the ring sections or leaving an opening therebetween, and the shoulders form abutments for the flat ends of the sections.

It will be understood that the rings may be made in various sizes, material and widths as desired, and that the chains may be decreased and multiplied as desired, or as occasion may demand without departing from the invention.

Having thus described my invention what

I claim as new and desire to secure by Letters Patent is:

In a device of the character described, a pair of plate rings each being divided into a pair of sections having overlapping ends forming a slip joint, one of said ends being off set and having a shoulder for free abutment of the other end so as to limit contraction and permit expansion of the rings, ear extensions of the off sets projecting inwardly from the rings in opposite pairs, and a bolt extending through the ears.

In witness whereof I hereunto set my hand in the presence of two witnesses.

FREDERICK McLAUGHLIN.

Witnesses:
 MEADE McCLATCHEY,
 MARTIN W. COOK.